DIGITAL COMMUNICATIONS SYSTEM

Filed Nov. 13, 1961

4 Sheets-Sheet 1

INVENTOR
John A. Kolling

BY Herbert M. Birch

ATTORNEYS

INVENTOR
John A. Kolling
BY Herbert M. Birch
ATTORNEYS

July 7, 1964 J. A. KOLLING 3,140,405

DIGITAL COMMUNICATIONS SYSTEM

Filed Nov. 13, 1961 4 Sheets-Sheet 3

INVENTOR
John A. Kolling

BY Herbert M. Birch

ATTORNEYS

July 7, 1964 J. A. KOLLING 3,140,405
DIGITAL COMMUNICATIONS SYSTEM
Filed Nov. 13, 1961 4 Sheets-Sheet 4

INVENTOR
John A. Kolling
BY Herbert M. Birch
ATTORNEYS 3,140,405
Patented July 7, 1964

3,140,405

DIGITAL COMMUNICATIONS SYSTEM

John A. Kolling, St. Paul, Minn., assignor to Sperry Rand Corporation, New York, N.Y., a corporation of Delaware Filed Nov. 13, 1961, Ser. No. 151,826
34 Claims. (Cl. 307—88.5)

This invention relates to a digital communications system and more particularly to a digital communications system wherein an output driver circuit or circuits provide "high" and "low" signal inputs to twisted pair transmission lines connecting the driver circuits to input amplifier circuits, whereby logical signals are read out of one or more computer components and into one or more other computer components.

Twisted pair transmission lines are much cheaper to use than are co-axial lines. Also, the use of twisted pair lines permits many lines to be grouped together in a cable and thus, provides a saving in space.

The use of the cheaper type of line, however, is not without attendant difficulties. Because the lines are intertwined in close proximity with each other and the digital signals transmitted therethrough have fast rise and fall times the inherent coupling between the said lines causes crosstalk and noise signals to be induced therein. In addition, the charging and discharging rates of the transmission line capacitance are not symmetrical which causes the data rates to be limited.

It is an object of this invention to provide a digital communications system, whereby data may be transmitted over long twisted pair cables, with good crosstalk and ground loop noise rejection, at data rates limited only by cable parameters.

Another object of this invention is to provide a digital communications system comprising an output driver circuit feeding an input amplifier circuit through a twisted pair transmission line wherein said input amplifier circuit includes differential means in the input stage thereof for eliminating noise signals from transmitted data and wherein said driver circuit provides an impedance compensation to effect equal charging and discharging rates of the line capacitance of said transmission line.

Another object of this invention is to provide a digital communications system comprising an output driver circuit feeding an input amplifier circuit through a twisted pair transmission line, whereby reliable operation may be achieved at signal-to-noise ratios of one-to-five or better.

Another object of this invention is to provide a digital communications system comprising an output driver circuit feeding an input amplifier circuit through a twisted pair transmission line, whereby micro-second data rates may be achieved with commonplace components.

Still another object of this invention is to provide a digital communications system comprising an output driver circuit feeding an input amplifier circuit through a twisted pair transmission line, whereby the power dissipation per bit of data transmitted is relatively low compared to other systems of the same general type, permitting the use of as much as several thousand feet of cable.

Still another object of this invention is to provide a digital communications system comprising an output driver circuit feeding an input amplifier through a twisted pair transmission line wherein all of the above elements are direct coupled to provide a wide latitude in timing.

Still another object of this invention is to provide a digital communications system comprising an output driver circuit feeding an input amplifier through a twisted pair transmission line, wherein said driver circuit includes a time-varying impedance in the output stage thereof to effect an equal charging and discharging rate for the line capacitance of said transmission line.

Yet another object of this invention is to provide a digital communications system comprising an output driver circuit feeding an input amplifier through a twisted pair transmission line, wherein said input amplifier includes a non-saturating differential switching circuit for eliminating noise from the transmitted data at low signal levels.

These and other objects of this invention will become apparent with reference to the following specification and drawings which relate to preferred embodiments of the invention.

*The System*

Figure 1:
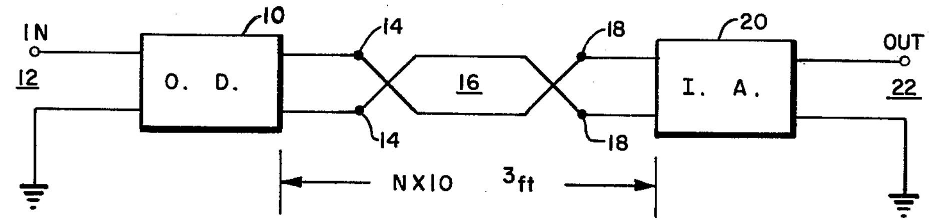
FIGURE 1 is a block diagram of the basic system of the invention including a single output driver circuit and a single input amplifier circuit.

Referring in detail to the drawings, and more particularly to FIGURE 1, one embodiment of a system of the present invention is shown as comprising an output driver circuit 10 having input terminals 12 and output terminals 14, connected at the said output terminals 14 through a twisted pair transmission line 16 to the input terminals 18 of an input amplifier circuit 20 having output terminals 22. The input terminals of the system correspond to the input terminals 12 of the output driver 10 while the output terminals of the system correspond to the output terminals 22 of the input amplifier circuit 22.

As shown in FIGURE 1, the length of the twisted pair transmission line 16, where a single output driver feeds a single input amplifier, may be expressed as $N \times 10^3$ feet where N has a value, for example, between one (1) and ten (10). This expression is used here to denote a maximum length on the order of one-thousand feet or greater and is not intended to define any minimum cable length.

Figure 2:
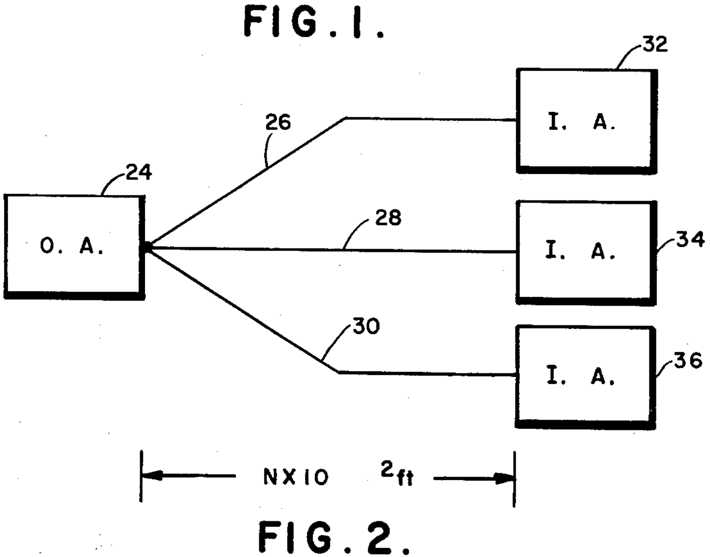
FIGURE 2 is a block diagram of a system under the present invention, wherein a single output driver circuit is feeding a plurality of parallel connected input amplifier circuits.
Figure 3:
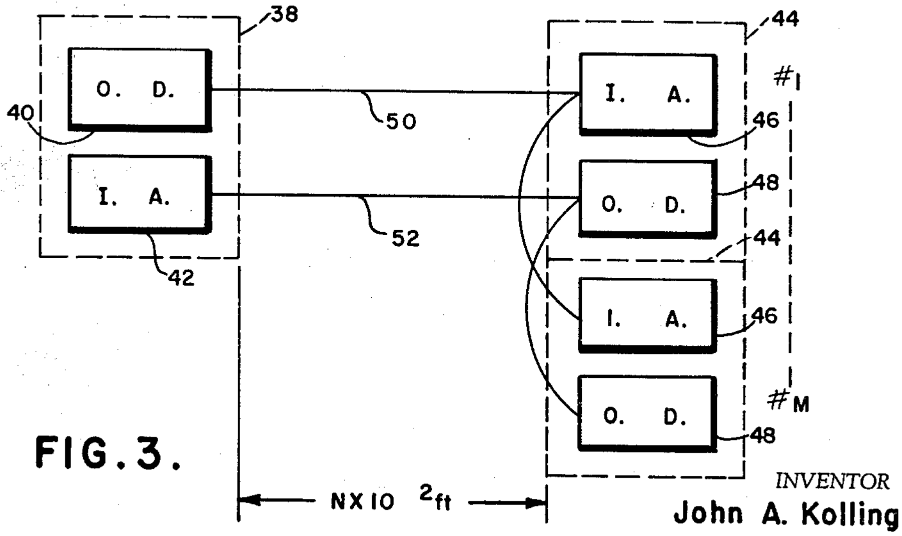
FIGURE 3 is a block diagram of a system under the present invention, wherein two-way communication between a computer and its external equipment is effected.

Referring now to FIGURE 2, another embodiment of a system under the present invention is shown in which a single output driver circuit 24 is connected through a plurality of twisted pair, parallel connected transmission lines 26, 28 and 30 to a like plurality of input amplifiers 32, 34 and 36, respectively.

In this arrangement the loading effects of the parallel connected circuits on the output driver 24 shorten the maximum permissible length of each cable branch to the order of hundreds of feet as opposed to thousands, this being represented on the drawing by the expression $N \times 10^2$ ft. where N has a value for example, between one (1) and ten (10).

Figure 5:
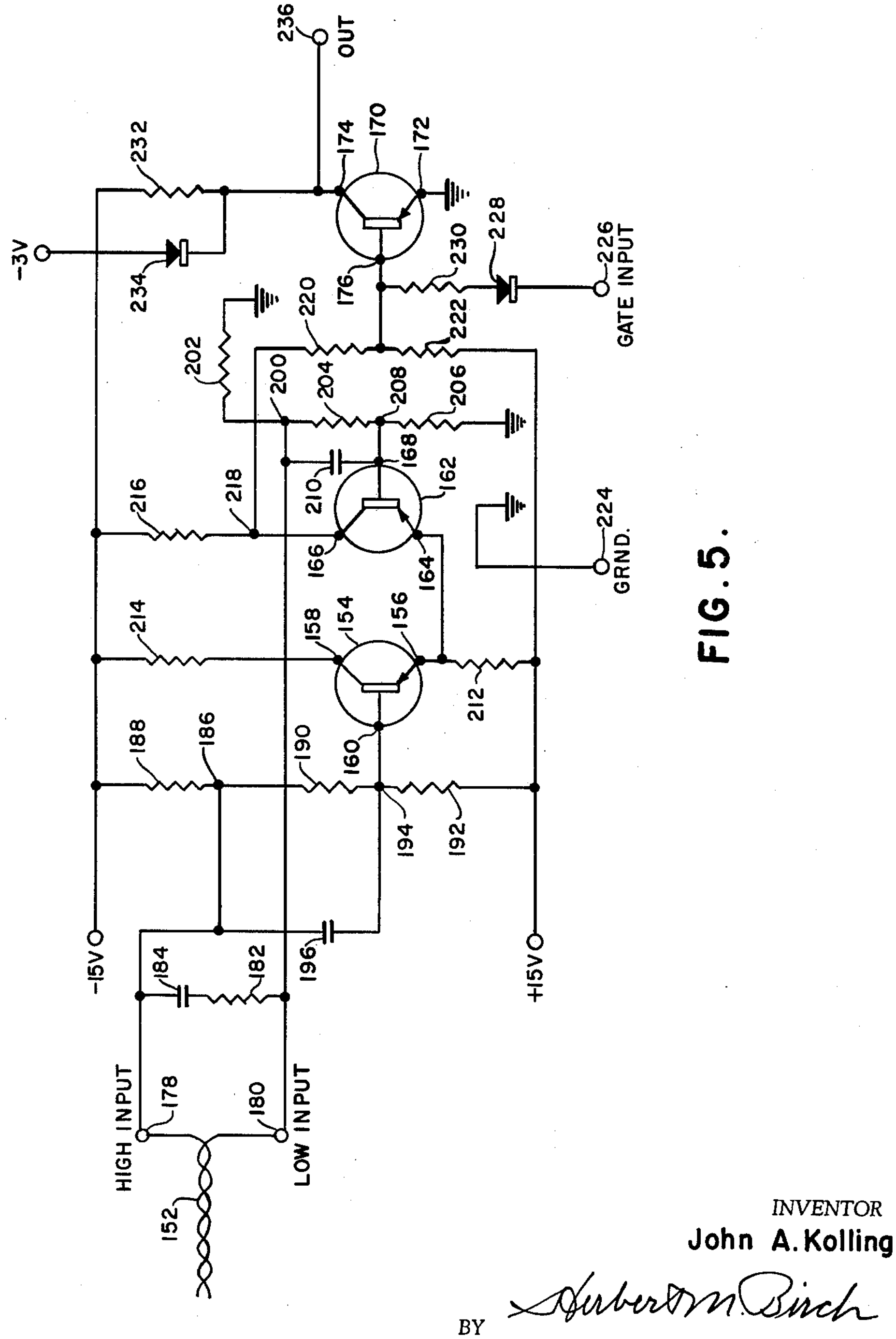
FIGURE 5 is a schematic diagram of an input amplifier circuit of the present invention.

Another embodiment of a system under the present invention is shown in FIGURE 5. This embodiment includes a computer 38 represented by dotted lines, which includes at least one output driver 40 and one input amplifier 42. Associated with the computer 38 are a plurality of external equipments 44 illustrated as numbers #1 . . . #M of a series.

Each of the external equipments 44 are shown as including at least one input amplifier 46 and one output driver 48.

The input amplifiers 46 of the external equipments 44 are all parallel connected through a single twisted pair line 50 to the output of the output driver 40 in the computer 38.

The input of the input amplifier 42 in the computer 38 is, on the other hand, connected through a second single twisted pair line 52 to the outputs of the output drivers 48 in the external equipments 44, the circuit being similar to that through the first line 50 since the output drivers 48 in the external equipments 44 have their outputs connected in parallel.

In this embodiment, as was described in relation to FIGURE 2, the maximum length of the cables 50 and 52 may be denoted by the expression $N \times 10^2$ ft.

*The Output Driver Circuit*

In order to maximize the rate at which digital data can be fed to the twisted pair transmission line or lines of the present system, the output driver circuit must provide a means whereby the charging and discharging rates of the line capacitance of the twisted pair transmission lines can be made equal at the faster of the two rates.

Figure 4:
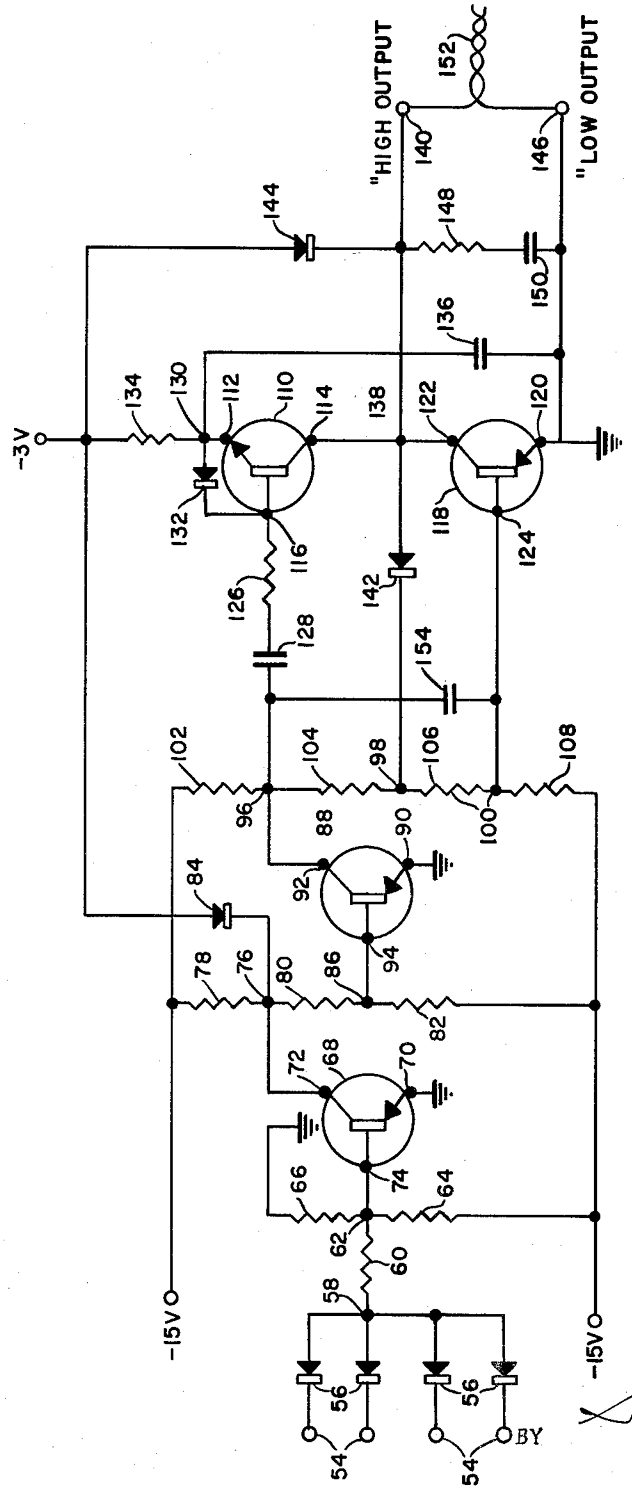
FIGURE 4 is a schematic diagram of an output driver circuit of the present invention.

A preferred embodiment of the output driver circuit of the present invention is shown in FIGURE 4.

The input stage of the output driver circuit is a standard "or/inverter" circuit having a plurality of signal input terminals 54 each connected through a diode 56 to a common input node 58. The input node 58 is coupled through a resistor 60 to the intermediate terminal 62 of a voltage divider comprising a pair of resistors 64 and 66 connected in series, as shown, between +15 volts and ground. The active element in the input stage comprises a first transistor 68 of the P–N–P type having emitter, collector and base electrodes 70, 72 and 74, respectively.

The input signal at the intermediate terminal 62 on the voltage divider is applied to the base electrode 74 of the transistor 68, the emitter electrode 70 being grounded and the output being taken from the collector electrode 72.

The collector electrode 72 of the first transistor 68 is connected to a power amplifier stage through a first intermediate terminal 76 of a second, three segment, voltage divider comprising three resistors 78, 80 and 82 connected in series between minus 15 volts and +15 volts as shown. The said first intermediate terminal 76 of the second voltage divider is also connected through a clamping diode 84 to minus 3 volts with the diode 84 so poled as to clamp the said first terminal 76 at a potential of minus 3 volts when the first transistor 68 is not conducting.

The second intermediate terminal 86 of the second voltage divider comprises the input terminal for the active element of the power amplifier stage. This active element comprises a second transistor 88 of the P–N–P type having emitter, collector and base electrodes 90, 92 and 94, respectively. The input from the said second intermediate terminal 86 on the second voltage divider is brought into the base 94 of the second transistor 88, the emitter electrode 90 being grounded and the output being taken from the collector electrode 92.

The amplified signal from the second or power amplifier stage of the output driver circuit is coupled to the final or output stage of the said driver circuit through a third voltage divider having first, second and third intermediate terminals 96, 98 and 100, respectively, defined by the junctions between four resistors 102, 104, 106 and 108, respectively, connected in the foregoing order between minus 15 volts and +15 volts as shown. The amplified output signal from the said power amplifier stage is fed from the collector 92 of the second transistor 88 to the first intermediate terminal 96 of the said third voltage divider.

The active portion of the output stage comprises a pair of complementary transistors including a third transistor 110 of the N–P–N type having emitter, collector and base electrodes, 112, 114 and 116, respectively and a fourth transistor 118 of the P–N–P type having emitter, collector and base electrodes 120, 122 and 124, respectively.

The base 116 of the third transistor 110 is the controlling or input electrode therefore and is connected through an R–C series circuit, comprising a resistor 126 and a capacitor 128, to the said first intermediate terminal 96 of the third voltage divider.

The emitter 112 of the third transistor 110 is connected to a node 130 which is in turn coupled through a clamping diode 132 to the base electrode 116 of the third transistor, through a current-limiting resistor 134 to minus 3 volts and through a capacitor 136 to ground as shown. The emitter electrode 120 of the fourth transistor 118 is, on the other hand, merely grounded.

The collector electrodes 114 and 122 of the third and fourth transistors 110 and 118, respectively are directly connected, as shown, with a common node 138 which corresponds to the "high" output terminal 140 of the output driver circuit. This node 138 is connected through a clamping diode 142 to the second intermediate terminal 98 of the third voltage divider and through another clamping diode 144 to minus 3 volts as shown.

The "low" output terminal 146 of the output driver circuit corresponds to the grounded emitter electrode 120 of the fourth transistor 118. The "high" and "low" terminals 140 and 146, respectively may be selectively shunted by an R-C series circuit or the like as shown by the resistor 148 and capacitor 150 to provide a proper terminating impedance for the twisted pair transmission line 152 connected with the said "high" and "low" output terminals.

The controlling or input electrode for the fourth transistor 118 is the base electrode 124 which is directly connected to the third intermediate terminal 100 of the said third voltage divider.

Both of the input circuits for the third and fourth transistors are R-C coupled through a capacitor 154 connected across the first and third intermediate terminals 96 and 100 of said third voltage divider in parallel with the two series connected resistors 104 and 106 between the said terminals.

Before commencing a description of operation of the above-defined output driver circuit, a discussion of the exemplary bias voltages shown in FIGURE 4 and their relationship with the system logic is necessary for a complete understanding of the circuit operation.

A "0" logical input at the input terminals 54 is effected by 0-volts at all of the input terminals 54 and becomes a "0" logical output represented by minus 3 volts at the output terminals 140 and 146.

A "1" logical input at the input terminals 54 is effected by minus 3 volts at any one of the input terminals 54 and becomes a "1" logical output represented by 0-volts at the output terminals 140 and 146.

The general operation of the driver circuit is such that when all of the inputs 54 are a logical "0," the first transistor 68 is cut off causing the second transistor 88 in the power amplifier stage to conduct and in turn cause the fourth transistor 118 in the output stage to cut off placing the "high" signal output terminal 140 at a potential of minus 3-volts via the action of the clamping diode 144 between the said "high" output terminal 140 and the minus 3 volt supply. The minus 3 volt output is representative of a logical "0" output. When any or all of the inputs 54 receive a logical "1" represented by a minus 3 volts input, the first transistor 68 conducts which causes the second transistor 88 in the power amplifier stage to cut off and permit the fourth transistor 118 in the output stage to conduct placing the "high" output terminal 140 and associated line at ground or zero potential representative of a logical "1" output.

It will be noted that the foregoing general operation has been set forth to the exclusion of the third transistor 110.

In a normal transistor circuit, the third transistor 110 would ordinarily be replaced by a current limiting resistor of suitable value placed in circuit with the collector electrode 122 of the fourth transistor 118. However, this type of circuit has the disadvantage that while the distributed capacitance of the transmission line will discharge rapidly through low impedance path provided by the fourth transistor 118 when it is in the conducting state, the biasing of the said fourth transistor 118 to cut-off will cause the said distributed capacitance of the transmission line to charge through the high impedance path of the said current limiting resistor connected between the collector electrode 122 and the minus 3 volt source in the said standard type of circuit.

In keeping with the invention, the third transistor 110 and its associated circuitry provides a time varying impedance varying at a changing rate regulated by maximize the charging rate of the distributed capacitance of the transmission line 152 through the said third transistor 110 after the fourth transistor 118 has been biased to cut-off.

The specific operation of the output driver circuit shown in FIGURE 4 is as follows:

When the input to all of the terminals 54 is a logical "0" the first transistor 68, as hereinbefore described, is cut off clamping the first intermediate terminal 76 of the said second voltage divider at minus 3 volts via the clamping diode 84 and sufficiently affecting the potential at the second intermediate terminal 86 of the second voltage divider such that the second transistor 88 is caused to conduct and bring the first intermediate terminal 96 of the said third voltage divider to ground potential from a value of normally about minus five volts when the said second transistor 88 is cut off. This action in turn raises the potential of the third intermediate terminal 100 of the said third voltage divider an amount sufficient to cause the fourth transistor 118 to cut off. This causes the "high" output terminal 140, the common collector junction 138 and that part of the twisted pair line 152 connected therewith to be clamped at minus 3 volts via the clamping diode 144, providing a logical "0" output for a logical "0" input.

Since the first intermediate junction 96 of the said third voltage divider is placed at ground potential in response to a logical "0" input, the capacitor 128, in the R-C circuit between the base electrode 116 of the third transistor 110 and the said first intermediate terminal 96, is charged on the right hand plate, as shown, to minus 3 volts via the resistor 134, node 130, clamping diode 132 and resistor 126. This causes the third transistor 110 to cut off except for the passage therethrough of negligeable leakage current by bringing the base 116 and emitter 112 of the third transistor 110 to substantially the same potential.

When the input to at least one of the input terminals 54 is a logical "1" (minus 3 volts), the first transistor 68 conducts causing the second transistor 88 to cut off. Thus, in response to a logical "1" input, the first intermediate terminal 96 of the said third voltage divider, to which the collector electrode 92 of the second transistor 88 is connected, is driven to a potential of approximately minus 5 volts as determined by the ratios of the resistors 102, 104, 106 and 108 in the said third voltage divider.

Since the charge across the capacitor 128 in circuit with the base electrode 116 of the third or N-P-N transistor 110 cannot change instantaneously, the voltage change from ground potential to minus 5 volts at the said first terminal 96 causes a potential of minus 8 volts to appear instantaneously on the right hand plate of the capacitor 128 which further biases the N-P-N transistor 110 into cut off.

The negative going change in potential, however, created at the other intermediate terminals 98 and 100 of the said third voltage divider causes the fourth or P-N-P transistor 118 to conduct to virtual saturation via the connection between the third terminal 100 of the third voltage divider and the base 124 of the said fourth transistor 118. This causes the collector electrode 122 of the fourth transistor and consequently, the common junction 138 between the collectors of the third and fourth transistors and the "high" output terminal 140 and its associated side of the twisted pair transmission line to be placed at zero or ground potential representative of a logical "1" output in response to the said logical "1" input at the input terminals 54.

In going from the minus 3 volt or logical "0" output state to the ground potential or logical "1" output state as described above, the fourth transistor 118 is biased to saturation permitting a rapid discharge, through the low impedance path presented by the emitter-collector path thereof, of the distributed capacitance of the twisted pair line 152.

If the input signal at the input terminals 54 should now shift back to a logical "0" causing the output state to go from a logical "1" to a logical "0," the line capacitance of the twisted pair line 152 would, in ordinary circuits, be presented with a high resistance charging path in the collector circuit of the fourth transistor 118 which, as hereinbefore described, is cut off in response to a logical "0" input. This disadvantage, which results in a charging rate for the said line capacitance which is much slower than the discharge rate thereof, is overcome by the third transistor 110 and its associated circuitry as follows:

While the "high" output terminal 140 and its associated line are held at ground potential in the logical "1" output state, the capacitor 128 in the base circuit of the third or N-P-N transistor 110 is charged from the minus 3 volt source through the resistor 134, diode 132, and resistor 126 to a minus 3 volt potential on the right hand plate thereof. The left hand plate of the capacitor 128, being connected to the first intermediate terminal 96 of the third voltage divider which as stated hereinbefore is at a potential of minus 5 volts in response to the logical "1" state of the driver circuit, is at a potential of minus 5 volts. Thus, a 2 volt potential difference exists across the capacitor 128.

If a logical "0" state is now imposed upon the driver circuit, the second transistor 88, as hereinbefore described, conducts and causes the said first intermediate terminal 96 to go to ground potential. This results in coupling a positive 2 volt input signal from the capacitor 128 into the base 116 of the third or N-P-N transistor 110 through the resistor 126 in the base circuit, causing the said transistor to conduct.

Now, since the "high" terminal 140 of the transmission line 152 is coupled to the common terminal 138 in the collector circuits of the third and fourth transistors 110 and 118, respectively, the line capacitance of the twisted pair line 152 is permitted to charge rapidly through the low impedance path presented by the collector-emitter path of the third transistor.

Also, since the capacitor 128 in the base circuit of the third transistor 110 is charging negatively through the said third transistor while it is in a conducting state, the coductivity of the transistor is a time varying impedance controlled by the charging rate of the capacitor 128 in the base circuit thereof. Thus, by properly selecting the value of the resistance 126 in the base circuit of the third transistor to time the rate of charge of the capacitor 128, the inherent initial period of heavy conduction in the third transistor may be controlled to maximize the charging rate of the line capacitance through the third transistor 110. Subsequent to the charging of the line capacitance, the right hand plate of the capacitance 128 finally reaches a value of minus 3 volts which causes the third transistor 110 to cut off.

*The Input Amplifier*

Extraneous and spurious signals such as noise and crosstalk in twisted pair transmission lines, either taken singly or grouped into cables, will appear on both of the lines of each twisted pair due to the intertwined relationship thereof.

Generally, the input amplifier comprises a differential non-saturating switching circuit and an amplifier stage whereby the difference between the potentials of the "high" and "low" lines of any twisted pair may be derived by the circuit to balance out the noise signals and regain the data signals as the said potential difference between the lines.

Referring in detail to FIGURE 5, the input amplifier circuit is shown as including, as active elements therein a first P-N-P transistor 154 having emitter, collector and base electrodes 156, 158 and 160, respectively; a second P-N-P transistor 162 having emitter, collector and base electrodes 164, 166 and 168, respectively; and a third P-N-P transistor 170 having emitter, collector and base electrodes 172, 174 and 176, respectively.

The signal input to the input amplifier is brought in through the twisted pair transmission line 152' fed from an output driver circuit or circuits, as hereinbefore described in conjunction with the showing of FIGURE 4, with the "high" input line of the pair 152' being connected to a first or "high" signal input terminal 178 and the "low" input line of the pair 152' being connected to a second or "low" signal input terminal 180. A terminating impedance for matching the input amplifier to the line 152' comprising a series connected resistor 182 and capacitor 184 is shown connected across the input terminals 178 and 180 although forming no specific part of the input amplifier circuit per se.

The "high" input terminal 178 is connected to a first intermediate terminal 186 of a first three segment voltage divider comprising three resistors 188, 190 and 192 connected in that order from minus 15 volts to +15 volts as shown. A second intermediate terminal 194 is provided on the said first voltage divider which is connected with the base electrode 160 of the first transistor 154. A capacitor 196 is connected between the said first and second intermediate terminals 186 and 194 thereby forming a parallel R-C circuit with the resistor 190 of the first voltage divider which comprises an R-C input coupling circuit from the "high" input terminal 178 to base 160 of the first transistor 154.

The "low" input terminal 180 is connected via a lead 198 to a first intermediate terminal 200 of a three segment network comprising three resistors 202, 204 and 206, the latter two being connected in series from the said first terminal 200 to ground to form a second two segment voltage divider and the first resistor 202 being connected from the said first terminal 200 to ground.

A second intermediate terminal 208 is provided in the three segment network between the resistors 204 and 206 and a capacitor 210 is connected between the said first and second intermediate terminals 200 and 208, respectively, in parallel with the resistor 204, whereby an R-C input coupling circuit is effected between the "low" input terminal 180 and the base 168 of the second transistor 162, the said base 168 being connected to the said second intermediate terminal 208.

The emitter electrodes 156 and 164 of the first and second transistors 154 and 162, respectively, are both connected through a common emitter resistor 212 to the +15 volt bias.

The collector electrode 158 of the first transistor 154 is connected through a current limiting resistor 214 to the minus 15 volt bias. The collector electrode 166 of the second transistor 162 is also connected to the minus 15 volt bias through another current limiting resistor 216.

The first and second transistors 154 and 162, respectively, and their associated circuitry form the input stage of the input amplifier circuit and as will be hereinafter described, comprise a non-saturating differential switching amplifier circuit. The output of the input stage is taken from an output terminal junction 218 between the collector electrode 166 of the second transistor 162 and the current limiting resistor 216.

The output terminal 218 of the first stage of the input amplifier is connected through an input resistor 220 to the base electrode 176 of the third transistor 170. The input resistor 220 forms a part of a two segment third voltage divider comprising the said input resistor 220 and another resistor 222 connected in series between the output terminal 218 of the input stage and the +15 volt bias. The third voltage divider thus determines the proportionate part of the output of the first stage which is fed to the third transistor 170.

The third transistor 170 forms the active element of the gated output stage of the input amplifier circuit. The logical control means for effecting the gating action is by way of a pair of "gate input" terminals 224 and 226.

The first "gate input" terminal 224 is connected to ground as shown. The second or signal carrying "gate input" terminal 226 is connected via a diode 228 and series resistor 230 to the base electrode 176 of the third transistor 170.

The emitter electrode 172 of the third transistor 170 is grounded while the collector electrode 174 connected to the minus 15 volt bias through a current limiting resistor 232 and to the minus 3 volt bias through a clamping diode 234.

The output terminal 236 of the input amplifier circuit coincides with the collector electrode 174 of the third transistor 170.

Taking line losses into account between an output driver circuit and the input amplifier circuit, the signal levels at the input terminals 178 and 180 of the input amplifier circuit are such that, in general operation, when the potential difference between the "high" input and the "low" input terminals is less negative than minus 1.1 volts, the signal received is a logical "1" input and when the potential difference is more negative than minus 1.7 volts, the signal received is a logical "0" input.

In the absence of noise, the nominal response of the input amplifier circuit is such that for a logical "1" input signal, the first transistor 154 is cut off and the second transistor 162 is turned on. With the second transistor 162 turned on, a positive potential is appplied to the base electrode 176 of the third transistor 170 cutting off the third transistor, whereby the collector electrode 174 thereof and consequently, the output terminal 236 are clamped to a minus 3 volt level via the clamping diode 234. The resulting minus 3 volt output is representative of a logical "1." On the other hand, when a logical "0" input signal is applied across the input terminals 178 and 180, the first transistor 154 is turned on and the second transistor 162 is turned off. With the second transistor 162 off, the base electrode 176 of the third transistor 170 goes to a negative potential and the third transistor is turned on. This places the collector 174 thereof and the output terminal 236 at ground potential which is representative of a logical "0" output.

An additional control is provided at the gate input terminals 224 and 226 by the selective application of blocking pulses at the "high" or signal carrying gate input terminal 226. By application of the proper bias through the series connected diode 228 and resistor 230 to the base electrode 176 of the third transistor 170, the output stage may be disabled by maintaining the third transistor 170 cut off regardless of the current state of the second transistor 162.

The operation of the input amplifier circuit in balancing out noise signals from the received logical data signals is as follows:

As an example, assume that the input signal at the terminals 178 and 180 is a logical "0" wherein the first transistor 154 is conducting and the second transistor 162 is cut off and that a negative going noise signal appears on both lines of the twisted pair 152'. The effect of the negative going noise signal at the "low" signal input terminal 180 would tend to turn on the second transistor 162 by virtue of applying a more negative bias to the base electrode 168 thereof through the R-C coupling circuit comprising the resistor 204 and the capacitor 210. However, since the negative going noise signal appears at the "high" input terminal 178 as well as at the "low" input terminal 180, the presence of this signal at the "high" terminal 178 further drives the first transistor 154 into its conducting range by applying a greater negative bias to the base electrode 160 thereof through the R-C coupling circuit comprising the resistor 190 and the capacitor 196.

Since both of these transistors 154 and 162 have a common emitter resistor 212, and since they are both substantially identical P-N-P types, both the first and second transistors cause substantially the same current to be drawn through the common emitter-resistor 212 in response to the noise input per se. However, in addition to the noise signal, the first transistor 154 is further biased into conductivity by the logical data input signal which, since it appears at the "high" terminal 178 is not acting to apply a more negative bias the base electrode 168 of the second transistor 162. There is thus created a net effect of a magnitude proportional to the logical data input signal that increases the back-bias in the base-to-emitter circuit of the second transistor 162 and keeps it in a cut off state while acting to maintain the first transistor 154 in a conductive state.

Thus, the effect of the noise is completely balanced out by the action of the differential amplifier stage comprising the first and second transistors 154 and 162, respectively, and their associated circuitry. The reverse condition of a logical "1" signal input in which the first transistor 154 is cut off and the second transistor 162 is conducting would produce the same end result since the combined logical data signal and noise signal act to produce a net biasing effect to maintain the proper transistor in the conductive state. This is so whether the noise signals are positive or negative.

While there is a possibility of oversaturation of that transistor which is conducting due to excessive noise signal amplitudes, the present input amplifier circuit has been tested to balance out noise signals common to both the "high" and "low" lines of a twisted pair which have a 16 volt peak-to-peak variation. By varying the proper circuit parameters, the input amplifier circuit may be made to properly handle data at all noise levels encountered in the system of the present invention.

The functions of the third transistor 170 and the gate input through the terminals 224 and 226 thereto are of course the same whether or not noise signals are present at the input terminals 178 and 180 of the input amplifier circuit.

*Output Impedance Compensation in the Output Driver*

Figure 6:
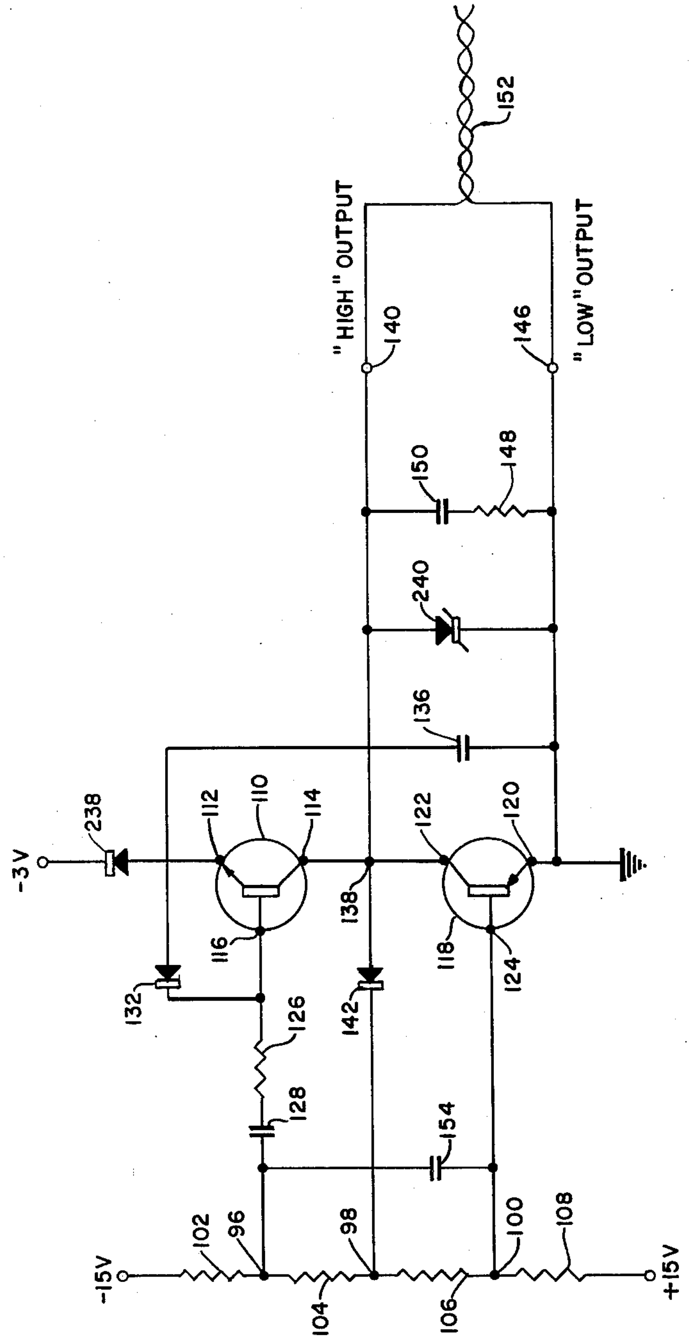
FIGURE 6 is a schematic diagram of another embodiment of the output stage of the output driver circuit of FIGURE 4.

Referring to FIGURE 6 wherein like elements of the output driver circuit of FIGURE 4 are represented by like numerals, another embodiment of the output driver circut is shown wherein the output impedance of the said driver circuit is maximized by reducing the resistance across the line with the power off, presented by the output driver circuit to the drive line 152, to a minimum when the D.C. power is turned off at the driver circuit.

This compensation is provided since the output driver circuit of FIGURE 4 presents a low impedance to the drive line 152, with the D.C. power cut off at the driver circuit, having a sufficient resistance component across the line to cause a logical "1" to appear on the line if the D.C. power at the sending end either fails or is turned off. If this is undesirable for certain logical applications the embodiment of FIGURE 6 will present a logical "0" to the line 152 in the event of power failure or cut off at the sending end.

The compensation is accomplished by replacing the current limiting resistor 134 in the collector circuit of the third transistor 110, as shown in FIGURE 4, with a semiconductor diode 238 poled as shown in FIGURE 6, removing the clamping diode 144 between the minus 3 volt bias and the "high" output terminal 140 and placing a Zener diode 240 across the output terminals 140 and 146 of the output driver circuit.

The Zener diode is chosen so that a minus three volt potential difference from the "low" output 146 to the "high" output 140, representative of a logical "0," may be maintained.

As can be seen from the foregoing specification and drawings this invention provides a novel system for transmitting logical data over twisted pair transmission lines, wherein a novel output driver circuit at the sending end of the line provides synchronized low impedance charging and discharging paths for the line capacitance to minimize both the rise and fall times of the transmitted logical pulses from preselected sending equipment and wherein a novel input amplifier circuit at the receiving end of the line provides a means for balancing out noise signals common to both lines and amplifying and transmitting only the logical data signals from the line to preselected receiving equipment.

It is to be understood that the embodiments shown and described herein with respect to the system of the invention and the novel components of the said system are for the purpose of example only and are not intended to limit the scope of the appended claims.

What is claimed is:

1. A digital communications system for transmitting logical data signals between equipments, at high noise levels and high data rates, from the output of one or more of said equipments to the input of one or more of said equipments comprising a twisted pair transmission line, including high and low signal lines and having a characteristic line capacitance between at least one output and one input of said equipments, an output driver circuit for feeding data to the transmission line from the said one output at one end of said transmission line and an input amplifier circuit for feeding data to the said one input from the said transmission line at the other end thereof; said output driver circuit including a first electronic means connecting said high line to said low line, control means for said first electronic means for selectively rendering said first electronic means conductive or non-conductive to present, respectively, a low impedance or a high impedance current path between said high and low lines, and a second electronic means in circuit with said first means and controlled by said control means concurrently with said first means to provide a low impedance current path between said high and low lines when said first means is nonconducting and vice-versa, whereby the said characteristic line capacitance of said transmission line is provided with both a low impedance discharge path and a low impedance charging path through said first and second electronic means, respectively, and whereby the discharging and charging rates, respectively, of the said line capacitance are made substantially equal; and said input amplifier including a switching, non-saturating, differential input stage comprising a first electronic device connected at its input to said high line, a second electronic device connected at its input to said low line, said first and second electronic devices being, respectively, concurrently conducting and non-conducting and vice-versa in response to predetermined logical data signals, and a common biasing impedance providing a common current path at the outputs of said first and second electronic devices, whereby the simultaneous appearance of a noise signal on both said high and low lines along with a data signal on one of the said lines, of a sufficient magnitude when applied to the inputs of said devices to render both said first and second electronic devices conductive, will provide only a net effect on said devices of a magnitude equal to the strength of said data signal and cause only a selected one of said devices to conduct and whereby the noise signals in the said system are balanced out at the input stage of the said input amplifier circuit.

2. The invention defined in claim 1, wherein the said first and second electronic means in said output driver circuit comprise complementary semi-conductor devices.

3. The invention defined in claim 1, wherein the said first and second electronic devices in said input amplifier circuit comprise a pair of like polarity transistors each having emitter, collector and base electrodes and the said common biasing impedance in circuit therewith comprises a common emitter resistor.

4. The invention defined in claim 1, wherein the said first and second electronic means in said output driver circuit comprise complementary semi-conductor devices; and wherein the said first and second electronic devices in said input amplifier circuit comprise a pair of like polarity transistors each having emitter, collector and base electrodes and the said common biasing impedance in circuit therewith comprises a common emitter resistor.

5. The invention defined in claim 1, wherein said output driver circuit further includes a logical data input stage, and wherein said control means for said first and second electronic means comprises biasing means controlled by the output of said input stage, and timing means in circuit between said biasing means and said second electronic means for applying a time varying bias to said second electronic means, whereby said second electronic means is controlled to present a time varying impedance in the charging path of said characteristic line capacitance.

6. The invention defined in claim 1, wherein said input amplifier further includes a third electronic device having its conductive state controlled in response to the conductive state of said second device, further control means comprising a source of gating signals for selectively enabling or inhibiting said third device regardless of the conductive state of said second device, and bias means in circuit with said third device for producing logical output signals representative of the conductive state of said third device, whereby upon the occurrence of an enabling gating signal from said further control means, said input amplifier circuit produces a logical output determined by the conductive state of said third electronic device in response to the conductive state of said second device in said switching, non-saturating, differential input stage.

7. The invention defined in claim 1, wherein said output driver circuit further includes a logical data input stage, and wherein said control means for said first and second electronic means comprises biasing means controlled by the output of said input stage, and timing means in circuit between said biasing means and said second electronic means for applying a time varying bias to said second electronic means, whereby said second electronic means is controlled to present a time varying impedance in the charging path of said characteristic line capacitance; and wherein said input amplifier further includes a third electronic device having its conductive state controlled in response to the conductive state of said second device, further control means comprising a source of gating signals for selectively enabling or inhibiting said third device regardless of the conductive state of said second device, and bias means in circuit with said third device for producing logical output signals representative of the conductive state of said third device, whereby upon the occurrence of an enabling gating signal from said further control means, said input amplifier circuit produces a logical output determined by the conductive state of said third electronic device in response to the conductive state of said second device in said switching non-saturating, differential input stage.

8. The invention defined in claim 1, wherein said output driver circuit includes impedance compensation means presenting to said transmission line a substantially infinite output impedance at the output of said output driver circuit in the absence of operating power in the said driver circuit.

9. The system defined in claim 1, wherein a single output driver circuit is coupled to feed a plurality of input amplifier circuits via a like plurality of parallel connected twisted pair transmission lines.

10. The system defined in claim 1, wherein a single output driver circuit having a single output is coupled to feed a plurality of input amplifier circuits having a like plurality of parallel connected input terminals via a single twisted pair transmission line between the output of said driver circuit and the inputs of said input amplifier circuits.

11. The invention defined in claim 1, wherein a plurality of output driver circuits having a like plurality of parallel connected outputs are coupled to feed a single input amplifier circuit having a single input via a single twisted pair transmission line between the outputs of said output driver circuits and the input of said input amplifier circuit.

12. The system defined in claim 1, wherein a plurality of output driver circuits having a like plurality of outputs are coupled to feed a single input amplifier circuit having a single input via a like plurality of twisted pair transmission lines each connected between a respective one of said outputs and said input.

13. A digital communications system for transmitting logical data pulse signals between equipments, at high noise levels and high data rates, from the output of one or more of said equipments to the input of one or more of said equipments comprising a twisted pair transmission line, including high and low signal lines and having a characteristic line capacitance, between at least one output and one input of said equipments, an output driver circuit for feeding data to the transmission line from the said one output at one end of said transmission line including means for alternately providing low impedance charging and discharging paths, respectively, for the said characteristic line capacitance to thereby provide substantially equal charging and discharging rates for said capacitance and an input amplifier circuit for feeding data to the said one input from the said transmission line at the other end thereof including means to balance out noise signals appearing on both said high and low lines and simultaneously separate and amplify a data signal appearing on one of said lines from the said noise signals.

14. The invention defined in claim 13, wherein said output driver circuit includes impedance compensation means presenting to said transmission line a substantially infinite output impedance at the output of said output driver circuit in the absence of operating power in the said driver circuit.

15. The invention defined in claim 13, wherein a single output driver circuit is coupled to feed a plurality of input amplifier circuits via a like plurality of parallel connected twisted pair transmission lines.

16. The invention defined in claim 13, wherein a single output driver circuit having a single output is coupled to feed a plurality of input amplified circuits having a like plurality of parallel connected input terminals via a single twisted pair transmission line between the output of said driver circuit and the inputs of said input amplifier circuits.

17. The invention defined in claim 13, wherein a plurality of output driver circuits having a like plurality of parallel connected outputs are coupled to feed a single input amplifier circuit having a single input via a single twisted pair transmission line between the outputs of said output driver circuits and the input of said input amplifier circuit.

18. The invention defined in claim 13, wherein a plurality of output driver circuits having a like plurality of outputs are coupled to feed a single input amplifier circuit having a single input via a like plurality of twisted pair transmission lines each connected between a respective one of said outputs and said input.

19. In a digital data communications system including a transmission line having high and low signal lines and a characteristic line capacitance, an output driver circuit for feeding data to said transmission line comprising a data signal input stage, a data signal output stage and a biasing means controlled by said input stage for controlling said output stage, said biasing means including first and second terminals thereon selectively held by said input stage at either a respective upper or a respective lower potential, and said output stage comprising first and second electronic means, each connected across said high and low signal lines, and a timing means, said first electronic means being connected to said first terminal on said biasing means and alternately biased by the said upper and lower potentials thereon to provide a high impedance path and a low impedance path between said high and low signal lines to effect first and second potential differences therebetween, and said second electronic means being connected to said second terminal of said biasing means through said timing means and biased by the said upper and lower potentials thereon and controlled by said timing means to provide a conductive path between said high and low signal lines having a time varying impedance therein varying from a low to a high value at a predetermined rate when said first electronic means is biased to provide a high impedance path between said high and low signal lines, whereby the alternate low impedance paths provided across said signal lines by said first and second electronic means provide low impedance charging and discharging paths, respectively, for said characteristic line capacitance to effect substantially equal charging and discharging rates thereof.

20. The invention defined in claim 19, wherein said first and second electronic means in said output stage comprise complementary semi-conductor devices.

21. The invention defined in claim 19, wherein said first and second electronic means in said output stage comprise first and second transistors, respectively, each having emitter, collector and base electrodes, one corresponding electrode of each being connected to said high line, another corresponding electrode of each being connected in circuit with said low line, the third electrode of said first transistor being connected to said first terminal of said biasing means and the third electrode of said second transistor being connected through said timing means to said second terminal of said biasing means.

22. The invention defined in claim 21, wherein said third electrode of each of said transistors is the base electrode and said one corresponding electrode connected with said high line is the collector electrode.

23. The invention defined in claim 21, wherein said first and second transistors are of complementary polarity.

24. The invention defined in claim 21, wherein said timing means comprises a resistor and a capacitor connected in series with the said third electrode of said second transistor and said second terminal of said biasing means and a second biasing means for charging said capacitor in response to a change in potential at said second terminal of said biasing means, whereby a time varying bias is applied to the said third electrode of said second transistor varying at a rate corresponding to the charging rate of said capacitor.

25. The invention defined in claim 24, wherein said third electrode of each of said transistors is the base electrode and said one corresponding electrode connected with said high line is the collector electrode.

26. The invention defined in claim 24, wherein the said first and second transistors are of complementary polarity.

27. In a digital data communications system including a twisted pair transmission line having high and low signal lines and wherein noise signals present in one of said signal lines will be present in both of said signal lines, an input amplifier circuit for feeding data from said transmission line including a switching, non-saturating, differential input stage comprising a first electronic device connected with one of said signal lines, a second electronic device connected at its input to the other of said signal lines, said first and second electronic devices being, respectively, concurrently conducting and non-conducting or vice-versa, in response to predetermined data signals, and a common biasing impedance providing a common current path at the outputs of said first and second electronic devices, whereby the simultaneous appearance of a noise signal on both said high and low signal lines along with a data signal on one of said signal lines, of a sufficient magnitude, when applied to the inputs of said devices to render both said devices conductive, will provide only a net effect on said devices of a magnitude equal to the strength of said data signal and cause only a selected one of said electronic devices to conduct and whereby the said noise signals are balanced out at the input stage of the said input amplifier circuit.

28. The invention defined in claim 27, wherein the said first and second electronic devices comprise first and second transistors of like polarity, respectively, each having emitter, collector and base electrodes and the said common biasing impedance in circuit therewith comprises a common emitter resistor.

29. The invention defined in claim 27, wherein said input amplifier further includes a third electronic device having its conductive state controlled in response to the conductive state of said second device, further control means comprising a source of gating signals for selectively enabling or inhibiting said third device regardless of the conductive state of said second device, and bias means in circuit with said third device for producing logical output signals representative of the conductive state of said third device, whereby upon the occurrence of an enabling gating signal from said further control means, said input amplifier circuit produces a logical output determined by the conductive state of said third electronic device in response to the conductive state of said second device in said switching, non-saturating, differential input stage.

30. In a digital data communications system including a twisted pair transmission line having high and low signal lines, an input amplifier comprising a power supply and first, second and third transistors each having emitter, collector and base electrodes, one of the electrodes of said first transistor being connected to one of said signal lines, the corresponding one of the electrodes of said second transistor being connected to the other one of said signal lines, means connected with said one of said electrodes of said first and second transistors for rendering said first and second transistor concurrently conductive and non-conductive, respectively, and vice-versa in response to first and second predetermined potential differences between said signal lines, one of the remaining electrodes of the first transistor and the corresponding one of the remaining electrodes being connected through a common biasing resistor to one side of said power supply, the other corresponding remaining electrodes of said first and second transistors each being connected to the other side of said power supply, the said other remaining electrode of said second transistor also being connected to one of the electrodes of said third transistor through a first control means, a second control means comprising a source of gating signals connected to said one of the electrodes of said third transistor for selectively enabling or inhibiting said third transistor, said first control means acting to render said third transistor conductive when said second transistor is non-conductive and vice-versa, and further means connected with one of the remaining electrodes of said third transistor for producing a first logical output signal when said third transistor is conducting and a second logical output signal when said third transistor is non-conducting.

31. The invention defined in claim 30, wherein said one of the electrodes of each of said first, second and third transistors comprises the base electrode.

32. The invention defined in claim 31, wherein the said one of the remaining electrodes of the said third transistor comprises the collector electrode.

33. The invention defined in claim 32, wherein the said one of the remaining electrodes of said third transistor comprises the collector electrode.

34. The invention defined in claim 31, wherein the said one of the remaining electrodes of each of said first and second transistors comprises the emitter electrode.

References Cited in the file of this patent

UNITED STATES PATENTS

| | | |
|---|---|---|
| 2,734,944 | Green et al. | Feb. 14, 1956 |
| 2,880,332 | Wanlass | Mar. 31, 1959 |
| 2,995,667 | Clapper et al. | Aug. 8, 1961 |
| 2,997,606 | Hamburger et al. | Aug. 22, 1961 |
| 3,071,651 | Frankel | Jan. 1, 1963 |
| 3,077,566 | Vosteen | Feb. 12, 1963 |

FOREIGN PATENTS

| | | |
|---|---|---|
| 159,314 | Australia | Mar. 19, 1953 |
| 809,669 | Great Britain | Feb. 25, 1959 |